United States Patent
Pabst et al.

[11] Patent Number: 5,413,528
[45] Date of Patent: May 9, 1995

[54] AIR CONDITIONING SYSTEM FOR MOTOR VEHICLES

[75] Inventors: Hans G. Pabst, Gaimersheim; Holger Grossmann; Heinz Wiedemann, both of Ingolstadt; Fritz Naumann, Stammham, all of Germany

[73] Assignee: Audi AG, Ingolstadt, Germany

[21] Appl. No.: 654,606

[22] PCT Filed: May 26, 1989

[86] PCT No.: PCT/EP89/00582
§ 371 Date: Feb. 8, 1991
§ 102(e) Date: Feb. 8, 1991

[87] PCT Pub. No.: WO90/01428
PCT Pub. Date: Feb. 22, 1990

[30] Foreign Application Priority Data
Aug. 12, 1988 [DE] Germany .......... 38 27 377.2

[51] Int. Cl.6 .................................. B60H 1/24
[52] U.S. Cl. ........................ 454/70; 454/141
[58] Field of Search ............ 454/70, 141, 238, 162, 454/164, 165

[56] References Cited

U.S. PATENT DOCUMENTS 4,581,988 4/1986 Mattei .................... 454/70
4,788,903 12/1988 Johnson .

FOREIGN PATENT DOCUMENTS 0214605 3/1987 European Pat. Off. .
3043934 6/1984 Germany .
3304575 8/1984 Germany .......... B60H 1/24
3533047 3/1987 Germany .
38541 3/1984 Japan .................... 454/238
2091413 7/1982 United Kingdom .

OTHER PUBLICATIONS

Patent Abstract of Japan, 60-2520, Dec. 1985.

Primary Examiner—Harold Joyce
Attorney, Agent, or Firm—Jacques M. Dulin

[57] ABSTRACT

Air conditioning (AC) system for motor vehicles comprising two fans connected in a series circuit whereby the first fan provides only a part of the air required for admission into the passenger compartment, and the remaining contribution to the desired quantity of air is provided by the second fan. Under normal operating conditions, where all openings such as windows, doors and sunroof (if any) are closed, both fans are independently regulated by a main controller device in such a manner that the air on the passenger compartment experiences a slight overpressure in order to permit the rapid entry and exit of air flow through the passenger compartment and a uniform air circulation therein. A manometer is included in the AC system to provide air pressure differential data (between the passenger compartment and the outside) to the main controller. The AC system also includes an AC program associated with a separate AC controller which are both subordinate to the main controller such that the excessive speed and related noise of each fan are greatly reduced. The independent control of each fan by the main controller results in ideal performance, even during the operating condition wherein the passenger compartment is partially opened (ie, where a window is rolled down).

10 Claims, 1 Drawing Sheet

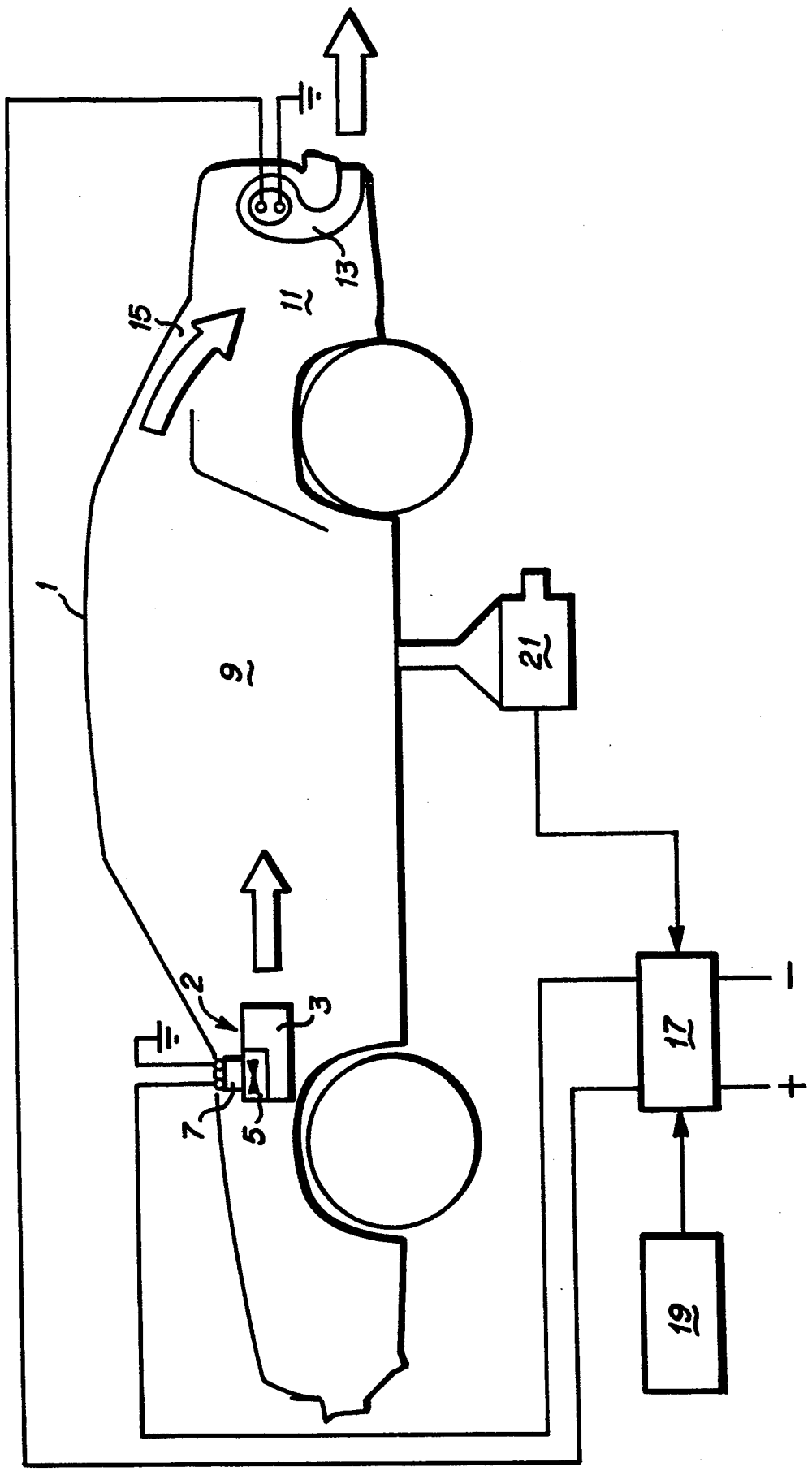

AIR CONDITIONING SYSTEM FOR MOTOR VEHICLES

FIELD

The invention relates to a method and apparatus for improving the operation and performance of an automotive air conditioning system of the type having two fans connected in a series circuit, including a first fan disposed in the dashboard area and a second fan disposed adjacent the rear vent openings of the automobile compartment. More particularly, the invention relates to a method and apparatus for providing an intelligent dual fan, serially connected air conditioning system which automatically adjusts to changing pressure conditions within the automobile chassis and whereby the noise generated from the fans is greatly reduced.

BACKGROUND

The typical air conditioning unit found in most automobiles comprises of a heating and/or ventilating fan in the dashboard region and includes a manifold for directing hot or cold air out through various openings above and/or below the dashboard. Examples of air conditioning units providing an additional second fan are disclosed and described in DE-OS 33 04 575 and DE-OS 30 43 934.

The air conditioning unit described in DE-OS 33 04 575 places an additional fan in the rear region Of the passenger compartment and is mounted to the existing rear vent opening located therein. The additional fan is provided to achieve a faster air exchange by exhausting interior air from the passenger compartment to the outside ambient atmosphere.

DE-OS 30 43 934 teaches to provide a second fan (in addition to a first fan housed in a conventional manner in the dash board) behind the back passenger seat to provide a uniform air circulation within the passenger compartment.

The addition of a second fan for the improvement of the operation of automotive air conditioning systems typically involves a trade off in driver (and passenger) comfort. For an air conditioning system employing two fans to perform adequately at higher vehicular speeds, the fans must be operated at their performance limits. This results in an undesirable increase in the amount of fan noise perceived by the driver and passengers. The undesirable fan noise is only compounded by the addition of a second fan in the rearward regions of the passenger compartment.

Therefore, there is a definite need in the art to provide a quiet air conditioning system having the advantages of quick air exchange between exterior and interior air and which provides uniform air circulation in the passenger compartment. There is also a need in the art to provide an improved dual fan air conditioning system whereby the noise generated by the fans is greatly reduced, and where the system is intelligent such that the fans recognize a sudden change in the passenger compartment air pressure (such as a sudden pressure drop in response to an opened window) and do not attempt to operate near their performance limits in order to keep the passenger compartment pressurized.

THE INVENTION

OBJECTS

It is among the objects of the present invention to provide a method and apparatus for operation of an automotive air conditioning system having a second additional fan placed adjacent the rear vent openings of the passenger compartment to provide for quick air exchange and uniform air circulation;

It is another object of the present invention to provide a method and apparatus for an improved dual fan, serially connected automobile air conditioning system whereby the noise generated by the fans is greatly reduced under all operating conditions;

It is another object of the present invention to provide a method and apparatus for an improved dual fan, serially connected automotive air conditioning system whereby an independent controller is provided to control the output of the two fans by determining the pressure difference between the interior passenger compartment and the outside ambient atmosphere;

It is still another object of the present invention to provide a method and apparatus for an improved dual fan, serially connected automotive air conditioning system which has an air conditioning program to specify the air quantity and is subordinate to the controller so that control of the output performance of each fan is affected in response to changing internal pressure conditions;

Still other objects will be evident from the specification, drawing and claims in this case.

DRAWINGS

The invention is illustrated in more detail by reference to the drawing in which:

The FIGURE is a schematic of an automobile chassis showing the air flow and control logic of the air conditioning unit within the vehicle chassis.

SUMMARY

An air conditioning system for motor vehicles is provided having two fans serially connected and disposed within the vehicle so that the passenger compartment experiences a slight overpressure as compared to the outside ambient atmosphere and uniform air circulation and rapid air exchange is achieved. The dual fan air conditioning system comprises a first fan disposed within a conventional air conditioning unit housing in the dashboard of the vehicle and a second fan disposed adjacent a lateral chassis opening at the rearward-most portion of the trunk compartment. Air is directed through and compressed into the passenger compartment by the first fan which results in a slight overpressurization of the passenger compartment. This overpressurization causes the air to move in the rearward direction of the passenger compartment where it flows through a plurality of slits provided along the rear dash area adjacent the rear windshield. The air flow is thus directed into the trunk compartment where it is drawn by suction through the second fan and exhausted to the outside ambient atmosphere.

Each fan is separately and independently controlled by a single controller so that the overpressurized state of the passenger compartment or cabin pressure is maintained during all operating speeds of the vehicles (and hence the desired direction of airflow through the vehicle is achieved). The feature of separate and independent fan speed control also results in the desired effect of significantly lowering the noise level, as experienced by the driver and/or passengers, produced by each fan, as neither fan is required to be operated at its performance limit. In addition, any increase in the portion of the increased power required for operation of a second fan is compensated in part by the fact that the two independently controlled fans may be designed for overall smaller power output levels.

In a first operating condition, wherein the passenger compartment is completely sealed, ie, where all windows are rolled up, doors closed, and sunroof (if one is provided) is shut, the speed of each fan is independently increased or decreased by the controller as the vehicle changes speed during a driving trip.

We have found that increases of vehicle speed result in an increase in the stagnation pressure within the vehicle compartment, thus causing the fan speed of a conventional single fan air conditioning unit to likewise increase. This results in the production of excess noise generated by the fan operating at its performance maximum output. This is also the case in conventional dual fan air conditioning systems wherein the second fan is merely utilized to permit faster air circulation or air exchange within the passenger compartment. Thus, as vehicle speed increases, the speed of both fans likewise increases and an undesirable rise in vent noise generated by both fans is experienced.

In the present invention there is no appreciable rise in vent noise since the fan speed of any one fan is never required to be operated near its maximum performance output level as the second fan contributes to the overall airflow through the passenger compartment.

A manometer is also provided to compare the internal passenger compartment air pressure with the air pressure of the outside ambient atmosphere. The manometer sends the actual value of this measurement to the controller whereby the controller selects a desired value of air pressure (the desired value of the air pressure being slightly greater than the outside ambient air pressure) and uses this desired value to select and adjust fan speed.

An underpressurization of the compartment may be due to the fact that the forward fan speed is too slow and the rear fan speed is too fast (i.e. the forward fan is not pushing or compressing enough air into the passenger compartment at a rate faster than the air is vented off or sucked out of the passenger compartment by the second fan). The controller senses this condition and alters the fan speed of each fan accordingly.

In a second operating state wherein there is an opening in the passenger compartment to the outside ambient atmosphere (such as a rolled down window, open door, etc.) the controller deliberately overrides the program set by the air conditioning unit controller, thus preventing the forward fan from increasing its speed too much in order to try and match the demands of maintaining an overpressurized state within the passenger compartment. The rear fan is still permitted to run at a speed sufficient to exhaust air from the passenger compartment.

In an alternative embodiment, the first fan is disposed at the inlet to the heating and ventilation housing adjacent the radiator tank while the second fan is disposed within a conventionally placed air conditioning unit in the dashboard. As in the first, preferred embodiment, the speed of each fan is separately controlled by a controller such that positive air flow through the vehicle is achieved.

In both embodiments it is important to note that the placement of the additional fan (ie, the rear fan in the trunk of the first embodiment and the forward fan in the engine compartment of the second embodiment) is placed within a sealed compartment (ie, the trunk of the first embodiment and the engine compartment of the second embodiment) and thus does not contribute to the audible fan noise heard by the driver and/or passengers. The other fan, being disposed within the air conditioning unit controller of the dashboard area is never operated at its maximum output level because of the balancing and offsetting properties of the additional fan. Thus, this fan never generates a discernable increase in audible vent noise because of the optimizing affect of the independently controllable and serially connected second fan.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

The FIGURE, a schematic view of a vehicle chassis, shows an air conditioning unit housing 3 disposed within the dashboard area to the vehicle chassis 1. The housing 3 includes a first fan 5 which is driven by an electro-motor 7. In operation, outside air is sucked into the passenger compartment 9 by the forward fan 5 where it is then compressed or directed through a manifold or distribution system (not shown) to the passenger compartment 9.

A second fan 13 is provided in the lower rear portion of the trunk compartment 11. The trunk compartment 11 is separate and sealed off from the passenger compartment 9. Thus, placement of the second fan in this manner results in improved noise reduction as perceived by the passengers in the rearward seat since the rear seat assembly acts as a sound wall to noise generated by fan 13 within the trunk compartment 11. Air, which is directed from the passenger compartment, communicates with the trunk compartment 11 by a plurality of slits 15 provided in the region of the lower rear windshield edge. In operation, the passenger compartment 9 becomes overpressurized after the startup of the air conditioning system and this overpressurized state results in the flow of air in the direction of and through slits 15 into the trunk compartment 11, where it is then drawn by suction through fan 13 so that it can be exhausted to the ambient outside air via a rear or lateral chassis opening (not shown).

The overall system control comprises the air conditioning unit controller 19, separate controller 17, and manometer 21 for measuring the difference between inside and outside air pressures. Associated with the air conditioning unit controller 19 is an air conditioning program which initially instructs the system on the desired level of air conditioning (AC) required of the AC system as specified by the operator (driver or passenger).

As is shown in the FIGURE, controller 17 is the nerve center or brain of the control network for the present invention. Controller 17 directly controls the two fans 5 and 13 in response to the setting of the air conditioning unit controller 19 by the operator. Additional data that is to be employed by controller 17 in order to adjust the control settings of the fans 5 and 13 includes the feedback pressure differential information generated from manometer 21. Manometer 21 provides the controller 17 with continuous updated information on the status of the existing air pressure differential between the interior passenger compartment 9 and the outside ambient atmosphere.

OPERATION OF THE AIR CONDITIONING SYSTEM

The following description of the operation of the air conditioning system of the present invention will be presented with reference to two operating conditions.

Condition 1

The first operating condition assumes that all openings to the passenger compartment are sealed shut (ie, all windows are rolled up, all doors are closed and the sunroof, if the vehicle includes one, is pulled shut). Some vehicles already have sensors for this condition. When the air conditioning unit is switched on, the air conditioning program within the air conditioning unit controller 19 decides the quantity of air that is necessary for the system. This information is reported to the controller 17 which then drives the motors of fans 5 and 13 in accordance with the quantity of air selected by the air conditioning program. This results in the creation of slight overpressure within the passenger compartment 9. The pressure difference between the passenger compartment 9 and the outside environment is then measured by the manometer 21 which measures and records the actual value of the pressure difference and then reports this actual valve to the controller 17. A desired value of the pressure is then stored in controller 17. The desired value is selected to be greater than the instantaneous outside value by a set amount. Due to this offset, the passenger compartment always experiences a slight overpressure which facilitates the flow of air from the passenger compartment through the trunk compartment 11 and to the outside via fan 13, but in no way is this slight overpressure unpleasant to those inside the passenger compartment 9. The offset between the actual value of the pressure difference and the desired value is sufficient to ensure that no air is sucked into the passenger compartment due to air leaks within the passenger compartment 9.

An overpressure in the passenger compartment 9 above the desired value signifies that either the forward fan 5 is forcing too much air into the passenger compartment 9 or that rear fan 13 is sucking too little air from the trunk compartment 11. To correct for this situation, the controller 17 will either reduce the speed of fan 5 and/or increase the speed of fan 13. The air conditioning program associated with the air conditioning unit controller 19 is subordinate to the controller 17 and the controller 17 continuously monitors input from the air conditioning unit controller 19 and manometer 21 to correct for inadequate or unreasonable suggested pressure levels from the air conditioning program associated with controller 19 and to specify the necessary corrected air throughput for the entire system.

In the converse situation, where the pressure in the passenger compartment 9 falls below the desired value stored in the controller 17, then controller 17 either increases the speed of fan 5 and/or decreases the speed of fan 13 in response to the desired air throughput specified by the air conditioning program.

The above described control process is particularly suited for a driving trip wherein a number of speed changes of the vehicle are present. The independent control of the operating speed of fan 5 by the controller 17 greatly reduces the unpleasantness experienced by the driver and/or passengers from overpressurization or excessive fan noise associated with increases in vehicular speed. For example, in an automobile having a conventional air conditioning system wherein the speed of the forwardly disposed fan is constant and the driving speed is increased, the pressure within the passenger compartment will also increase and, since the stagnation pressure increases. The noise generated by the fan will likewise increase as it reaches its performance maximum output. By adding a second, additional fan with independent speed control, neither fan is pushed to its performance maximum as the independent control of the other fan eliminates the need for the full performance of a single fan. Thus, the noise due to each fan is never excessive.

Condition 2

In a second operating condition, the operation of the air conditioning system is the same as before with the exception of a window, door, or sunroof being opened in the vehicle. In this condition, it is not possible to generate the desired overpressure to the system. The air conditioning program of the controller 17 will recognize such a drastic drop in internal air pressure and will accordingly instruct the controller 17 to correct the operation of the forward fan 5 so that it does not attempt to operate at its maximum speed. In other words, the controller 17 is not fooled by the fan speed levels suggested by the AC program. The forward fan 5 speed will be intentionally decreased by a certain amount so that it does not attempt to meet the desired set value of the pressure level that was reported to the controller 17 by the pressure difference manometer 21.

The air conditioning program of the controller 19 is subordinate to the controller 17 so that the forward fan 5 is activated only in accordance with the setting of this program. In this second condition, the rear fan 13 is still permitted to run in order to ensure a better ventilation of the rear compartment.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. An air conditioning system for the climate control of the passenger compartment of motor vehicle having at least two compartments, a forward compartment and a passenger compartment, comprising in operative combination:
    a) a first fan for directing the flow of air into and pressurizing said passenger compartment;
    b) a second fan for exhausting said air flow from said passenger compartment; and
    c) means for regulating the speed of both of said fans with respect to each other wherein:
        i) said regulating means adjusts the workload and air throughput of each fan over the course of a driving trip in response to changes in pressure associated with variances in automobile velocity to reduce audible fan noise and maintain a slight overpressure in said passenger compartment to promote rapid air exchange with the outside ambient atmosphere in a first, window-closed operating condition; and ii) said regulating means reduces the workload and air throughput of each fan in a second, window-open operating condition.

2. An air conditioning system for motor vehicles as in claim 1 wherein said fan regulating means includes:
   a) an air conditioning unit controller having means for controlling the air throughput within said passenger compartment in response to a climate input by a driver or passenger;
   b) means for measuring the air pressure difference between said passenger compartment relative to the instantaneous value of said outside ambient atmosphere;
   c) a separate controller for the direct control of the speed of each of said fans; and
   d) said separate fan speed controller including means for updating and evaluating said air pressure differential information received from said measuring means, wherein:
      i) the fan speed of each of said fans is adjusted to match the specified air throughput of said air conditioning unit controller in said first window-closed operating condition; and
      ii) the fan speed of both of said fans is reduced to an air throughput level to a pre-determined substantially minimum air throughput range in said second window open operating condition.

3. An air conditioning system for motor vehicles as in claim 2 wherein said air conditioning unit controller is subordinate to said separate fan speed controller to prevent excess fan speed due to sudden pressure drops within said passenger compartment.

4. An air conditioning system for motor vehicles as in claim 3 wherein said air pressure differential measuring means includes a manometer.

5. An air conditioning system for motor vehicles as in claim 3 wherein:
   a) said first fan is disposed in the forward portion of said passenger compartment and is in air communication with at least one passenger compartment air intake duct to provide forced air into said passenger compartment; and
   b) said second fan is rearwardly disposed within said automobile in air communication with said passenger compartment having at least one vent opening to exhaust internal pressurized air from said passenger compartment to the ambient atmosphere.

6. An air conditioning system for motor vehicles as in claim 4 therein:
   a) said first fan is disposed in the forward portion of said passenger compartment and is in air communication with at least one passenger compartment air intake duct to provide forced air into said passenger compartment; and
   b) said second fan is rearwardly disposed within said automobile in air communication with said passenger compartment and having at least one vent opening to exhaust internal pressurized air from said passenger compartment to the ambient atmosphere.

7. An air conditioning system for motor vehicles as in claim 5 wherein:
   a) said motor vehicle includes a third compartment rearward of said passenger compartment;
   b) said passenger compartment includes means for air communication with said third compartment; and
   c) said second fan is disposed in said third compartment.

8. An air conditioning system for motor vehicles as in claim 6 wherein:
   a) said motor vehicle includes a third compartment rearward of said passenger compartment;
   b) said passenger compartment includes means for air communication with said third compartment; and
   c) said second fan is disposed in said third compartment.

9. A method for improving the operation and performance of an air conditioning system of a motor vehicle having at least 2 compartments, including a forward compartment and a passenger compartment, said air conditioning system having dual fans connected in a circuit, said method comprising in operative sequence the steps of:
   a) providing a first fan for forcing into said passenger compartment at least a portion of the total air throughput of said passenger compartment;
   b) providing a second fan for exhausting air from said passenger compartment of said automobile;
   c) providing means for controlling the air throughput of said passenger compartment;
   d) providing means for monitoring the pressure differential between said passenger compartment air pressure and the instantaneous outside ambient air pressure; and
   e) providing means for adjusting the speed of each of said fans in relation to said pressure differential monitored during a first window closed operating condition to produce said air throughput so that the workload of each fan is kept to minimum levels to reduce audible fan noise while maintaining a slight overpressure in said passenger compartment to promote rapid air exchange with the outside ambient environment.

10. A method for improving the operation and performance of an air conditioning system for motor vehicles as in claim 9 wherein said monitoring step includes the step of:
   a) providing means for downwardly adjusting the speed of each of said fans to a predetermined substantially nominal fan speed range in relation to said pressure differential monitored during a second window open operating condition so that both of said fans do not run at their maximum output levels in an attempt to maintain a slight overpressure within said passenger compartment.

* * * * *